United States Patent [19]
Moore

[11] Patent Number: 4,949,335
[45] Date of Patent: Aug. 14, 1990

[54] A TDM QUASI-DUPLEX SYSTEM

[75] Inventor: Morris A. Moore, West Palm Beach, Fla.

[73] Assignee: Motorola, Inc., Schaumburg, Ill.

[21] Appl. No.: 300,673

[22] Filed: Jan. 23, 1989

[51] Int. Cl.[5] .......................... H04J 3/16; H04B 1/54
[52] U.S. Cl. ......................................... 370/29; 370/31
[58] Field of Search ................. 370/29, 110.1, 31, 32, 370/24; 379/53; 358/85; 455/34, 68

[56] References Cited

U.S. PATENT DOCUMENTS

| | | | |
|---|---|---|---|
| 3,098,124 | 7/1963 | Fisher | 179/15 |
| 3,202,764 | 8/1965 | Adams et al. | 179/15 |
| 3,311,704 | 3/1967 | Filipowsky et al. | 179/2 |
| 3,529,088 | 9/1970 | Hauer | 179/2 |
| 3,943,444 | 3/1976 | Lundberg | 325/25 |
| 4,037,158 | 7/1977 | Eastmond | 325/22 |
| 4,476,558 | 10/1984 | Arnon | 370/29 |
| 4,644,105 | 2/1987 | Cameron | 379/56 |
| 4,715,059 | 12/1987 | Cooper-Hart et al. | 358/85 |
| 4,750,169 | 6/1988 | Carse et al. | 370/29 |
| 4,754,450 | 6/1988 | Lynk, Jr. et al. | 370/29 |
| 4,774,704 | 9/1988 | Gass et al. | 370/29 |
| 4,839,923 | 6/1989 | Kotzin | 370/29 |

Primary Examiner—Douglas W. Olms
Assistant Examiner—Min Jung
Attorney, Agent, or Firm—Juliana Agon; Daniel K. Nichols

[57] ABSTRACT

An improved quasi-duplex time division multiplexed (TDM) communication system provides for transmission by a talker until an interrupt command for role reversal is transmitted by a listener. Preferably, the time allocated for voice transmission is greater than the time allocated for command transmission. In this manner, the primary feature of full-duplex communications is provided simply while conserving spectrum.

12 Claims, 3 Drawing Sheets

A TDM QUASI-DUPLEX SYSTEM

BACKGROUND OF THE INVENTION

Conventional two-way radio systems operating in the duplex mode require two different frequencies for communication in two directions to take place simultaneously. However, this wastes spectrum. The main attraction for any full-duplex two-way radio system is the ability for the listener to interrupt and speak at any time. An approach, illustrated in U.S. Pat. No. 4,037,158, and assigned to the same assignee as the instant application, is to provide simulated duplex operation on a single channel, utilizing hardware control of the transmitter and receiver by sampling the channel for the presence of a carrier wave. This approach generally requires increased radio complexity.

Time division multiplexing (TDM) of voice and data onto a single channel is known to provide full-duplex radio operation. Typically, however, this requires at least two time slots for a radio to transmit half the time and to receive at half the time. While effective, this practice wastes spectrum since, in ordinary conversations, the talker usually receives only brief feedback responses (or acknowledgements) during his or her transmissions.

SUMMARY OF THE INVENTION

Accordingly, it is an object of the present invention to provide an improved quasi-duplex time division multiplexed communication system.

Briefly, according to the invention, the primary feature of full-duplex communications is provided while conserving spectrum and without undue complexity. A talker transmits while a listener receivers until a command (interrupt) code is transmitted by the listener. After appropriate signalling, the talker and listener changes roles and the original talker now listens. Preferably, the time allocated for voice transmission is greater than the time allocateed for receiving data for system synchronization or commands to maximize speech capacity throughput.

DESCRIPTION OF THE PREFERRED EMBODIMENT

Figure 1:
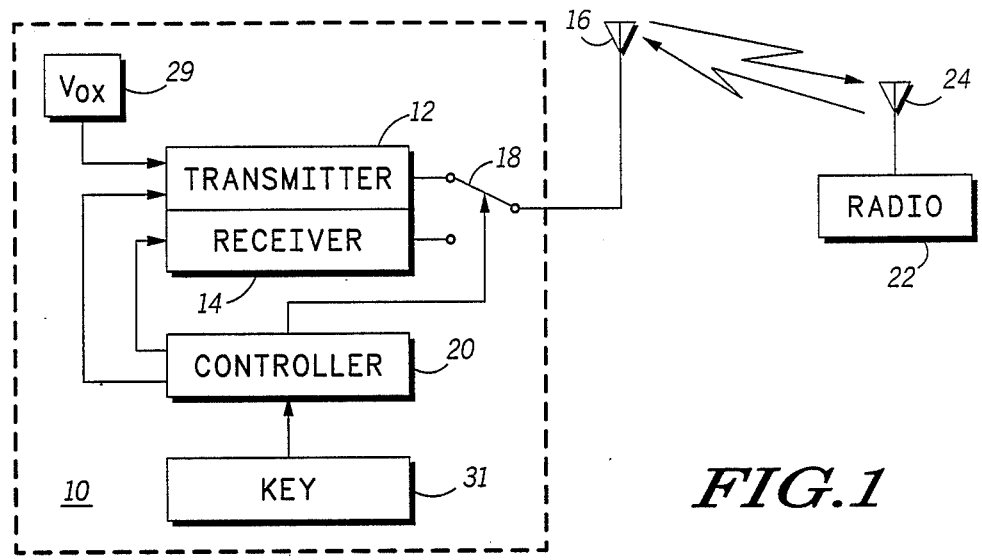
FIG. 1 is a block diagram of a communication system utilizing a TDM Quasi-Duplex System in accordance with the present invention.

Referring now by characters of reference to the drawings, and first to FIG. 1, a communication system utilizing a TDM Quasi-Duplex System in accordance with the present invention is illustrated. Basically, a two-way radio (or station) 10 includes a transmitter 12, a receiver 14, a controller 20, and an antenna switch 18. The transmitter 12 and receiver 14 are seleceitively connected to an antenna 16 via the switch 18. A manually operated key 31 coupled to one input of the controller 20, or a voice operated key 29 coupled to one input of the transmitter 12 selectively operates the controller 20. The radio 10 communicates with a second radio (or station) 22 having an antenna 24. The radio 22 may be identical to the radio 10 and may be connected to the antenna 24 as by an antenna switch 18 operated by a controller. As will be further explained, the controller 20, may include a microcomputer, which controls the operation of the transmitter 12, the receiver 14, and the switch 18.

Figure 2:
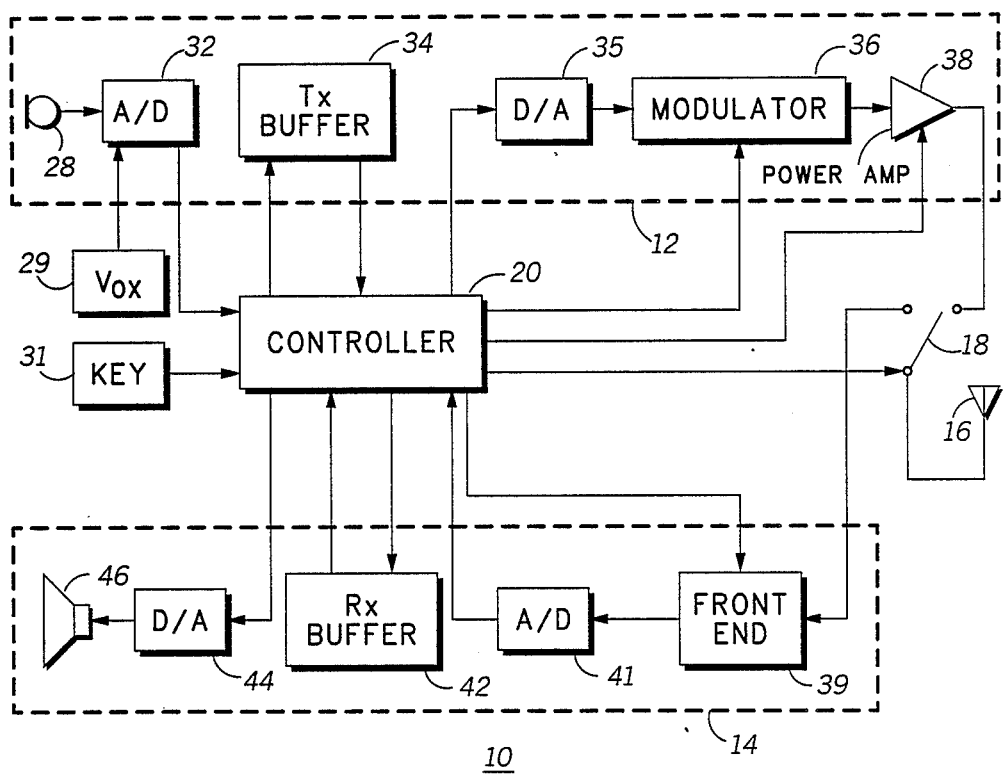
FIG. 2 is a block diagram of either radio of FIG. 1.
Figure 3A:
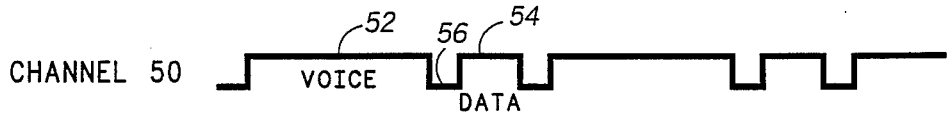
FIGS. 3a–m are timing diagrams illustrating the operation of the system of FIG. 1.
Figure 3B:
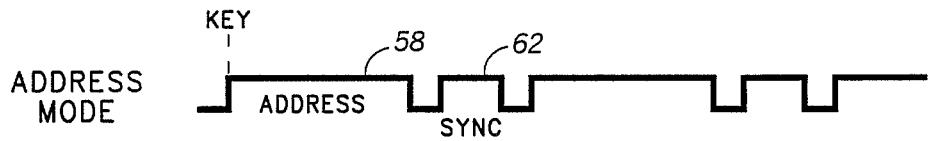
Figure 3C:
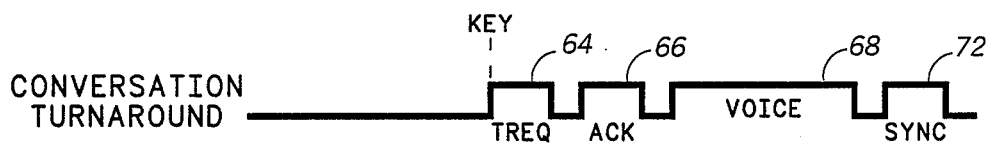
Figure 3D:
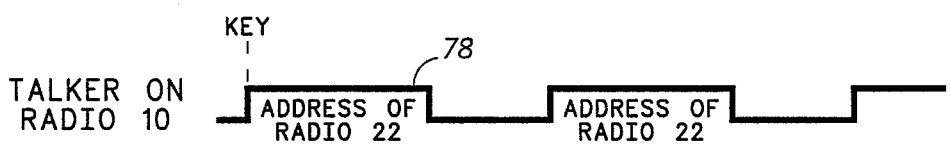
Figure 3E:
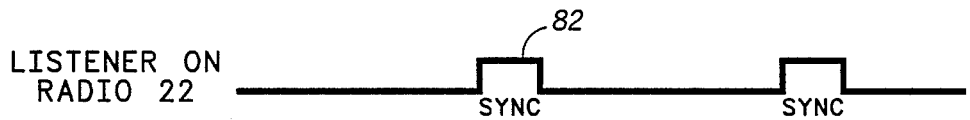
Figure 3F:
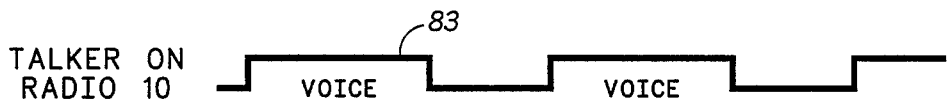
Figure 3G:
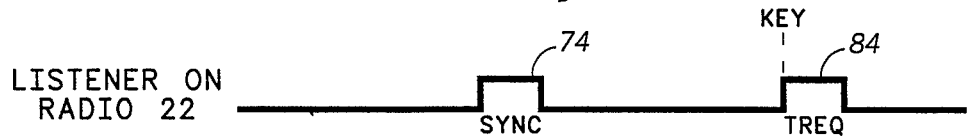
Figure 3H:
Figure 3I:
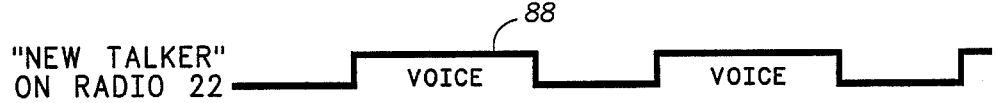
Figure 3J:
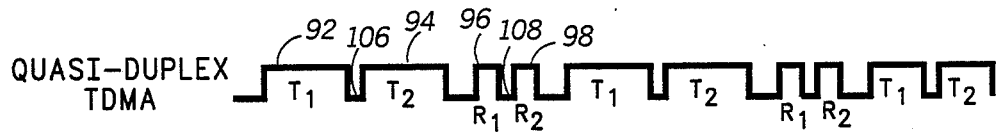
Figure 3K:
Figure 3L:
Figure 3M:
Figure 3N:

FIG. 2 illustrates a block diagram of the radio 10 (or 22). The transmitter 12 comprises a microphone 28, an analog to digital (A/D) converter 32, a transmitter buffer 34, a digital to analog (D/A) converter 35, a modulator 36, and a power amplifier 38. The microphone 28 is coupled, via the A/D converter 32, to the controller 20, which controls the input to the transmitter buffer 34. The ouput of the transmitter buffer 34 is fed into the controller 20, which regulates the input to the D/A converter 35. The output of the D/A 35 is fed into the modulator 36, which is connected to the power amplifier 38. The controller 20 also connects to one input of the modulator 36, and to the lower amplifier 38 to gate the modulator bursts on and off. Lastly, as previously mentioned, the controller 20 is coupled to and controls the switch 18. The output of the power amplifier 38 is connected to the switch 18 for application to the antenna 16. These elements may be of conventional construction as commonly used in the radio arts.

The receiver 14 typically comprises a front end 39, an analog to digital (A/D) converter 41, a receiver buffer 42, a digital to analog (D/A) converter 44, and a speaker 46. The front end 39 is connected, via the analog to digital (A/D) converter 41, to the controller 20, which controls the input to the receiver buffer 42. The output of the receiver buffer 42 is applied to one input of the controller 20 for digitall compression before application to the input of the D/A converter 44, which in turn is connected to the speaker 46. The controller 20 also couples to the front end 39.

Operationally, audio energy impressed upon the microphone 28 is digitized at normal speed (32) and buffered in the transmitter buffer 34. To achieve time compression suitable to properly TDM the communication channel, information is retrieved from the transmit buffer 34 at a rate exceeding that of which it was stored. The duration and timing of the slots are defined in accordance with any suitable TDM protocol. The controller 20 forwards this information to the modulator 36, via the D/A converter 35, and the modulated information is broadcast via the power amplifier 38 and the antenna 16, after application of the switch 18. Symmetrically, received audio is sampled in the A/D converter 41 and stored at the higher rate in the receiver buffer 42. The contents of the buffer 42 are applied via the D/A at normal speed to the speaker to generate speaker audio.

While an embodiment of the invention utilizing an analog transmission has been described and shown, it should be understood that a digital transmission embodiment is also envisioned as is illustrated in U.S. Pat. No. 4,754,450 incorporated herein, and assigned to the same assignee as the instant application. In that invention as is here, voice signals for transmission are analyzed and vo-coded into a digital signal to be synthesized back to voice messages in the receiver.

In the digital embodiment, at the talker end, speech samples from an A/D converter would be processed continuously by a speech encoder (if required to reduce the speech information rate) and stored in a transmit buffer. During a voice transmit burst, speech data would be retrieved from the transmit buffer and transmitted at the channel rate (greater than the speech information rate). For example, if the speech information rate was 9600 BPS, a channel transmission rate of 12000 BPS would allow for four fifths of a frame to be split between transmission from talker to listener and one fifth for the sync data transmission from listener to talker and the transmit/receive gaps required for switching as is known in the art. At the listener end, speech data would be written into the receive buffer at the transmission rate during the receive burst and read from the buffer continuously to provide input to the speech decoder which in turn would provide normal speed voice to the speaker circuits.

Connected to the input of the controller 20 is the transmit key 31. This may comprise a push-to-talk (PTT) switch as is commonly used with a radio, and the key 31 and microphone may be provided as a single unit. Alternatively the transmit key may be a voice operated relay (VOX) 29 coupled to the output of the A/D converter 32. In either case the transmit key can be of known construction. Conventional voice activated transmit systems often loose the initial portion of the first utterance. However, this invention overcomes this problem since the mike audio is sampled and buffered by 32 and 34 respectively, as soon as the information is outputted at the mike 28. A pointer inside the controller 20 could be "backed up" at the beginning of the voice prior to initiating voice transmission, thereby avoiding loss of speech due to the detect delay in the receiver. Since the VOX delay time is known, it may be compensated by retrieving the speech samples starting from this known time ahead of the VOX activation.

The sequence of operations just described is illustrated in FIGS. 3a–m wherein a radio frequency communication channel 50 having a conventional bandwidth is apportioned into substantially larger voice slots 52 than data slots 54 to achieve Time Division Multiplexing (TDM) of voice and data on a single channel. Gaps (or guards bands) 56 between the slots are reserved for the proper operation of the switch 18.

As indicated when the key is manually (or voice) activated by a talker on the calling radio 10, the ID of the listener's radio to be called, 22, will be repeatedly transmitted in the voice slots 58 and 78. The protocol is illustrated for talker and listener together and separately for clarification. The called unit 22 detects the address and begins acquiring synchronization adequate for TDM. When synchronization has been achieved, the called unit 22 sends a data burst designated as SYNC in data slots 62 and 82. Detection of SYNC by the calling unit 10 signals the start of voice conversation between the talker 10 and the listener 22. The talker transmits and the listener receives voice during the voice slots 52 and 83, while the talker receives and the listener transmits data in the data slots 54 and 74.

To interrupt the talker 20 (i.e. to change roles), the listener 22 transmits a command, referred to as the turn-around request code (TREQ) in the data slots 64 and 84 by manually (or vocally) activating the key 31 (or 29) as indicated. When the talker 10 detects TREQ 64 and 84, it acknowledges and transmits an ACK word in the first portion of the former voice slots 66 and 86. Referring to FIGS. 3h–n the reception of TREQ 64 and 84 by the talker 10 overrides any further voice transmission and forces the talker into the role of the "new listener". To become the talker once more, key 31 must be released and re-activated. The previous listener 22 now is the "new talker" that will transmit voice from unit 22 to unit 10 in the subsequent voice slots 68 and 88, and the previous talker 10 now is the "new listener" who will transmit the SYNC word in the subsequent data slots 72 and 92 to maintain TDM synchronization.

For simplicity, only one talker per time slot is illustrated in the previous diagrams. However, this invention extends to a Time Division Multiple Access (TDMA) quasi-duplex system where multiple talkers transmit in subdivided time slots 92, 94 and receive in slots 96, 98. By providing SYNC words 102, 104 along with at least gaps 106, 108 necessary to ensure non-overlapping segments, time isolation may be maintained to allow for proper system synchronization.

I claim as our invention:

1. A method for communicating a voice signal between at least two stations via a time division mmultiplexed communication channel arranged into voice segments and data segments, comprising the steps of:
    at a first station:
        (a) transmitting a voice signal during at least one of said voice segments allocated to said first station for transmitting voice;
        (b) receiving a command code during at least one of said data segments allocated to a second station for transmitting data; and
        (c) exchanging segment allocation so as to receive voice signals during at least one of said voice segments allocated for transmitting voice by said second station in response to said command code; and
    at said second station:
        (a) receiving said voice signal during at least one of said voice segments allocated to said first station for transmitting voice;
        (b) transmitting said command code during at least one of said data segments allocated to said second station for transmitting data; and
        (c) exchanging segment allocation for transmitting a voice signal during at least one of said voice segments allocated for transmitting voice by said second station in response to said command code.

2. In a quasi-duplex TDM communication system having at least one communication channel arranged to provide at least one information slot having an associated control slot, a device capable of communicating within said system, comprising:
    means for storing an information signal at a first rate to provide a stored signal, including means for extracting said stored signal at a second rate to provide a buffered signal;
    means for transmitting said buffered signal in a first mode during said at least one information slot allocated for transmission by a first device, and for transmitting control signals in a second mode during said control slot allocated for transmission by a second device;
    means for receiving signals representing said control signals in said first mode during said control slot allocated for transmission by said second device, and for receiving signals representing said buffered signal in said second mode during said at least one information slot allocated for transmission by said first device; and
    control means coupled to said transmitting means and said receiving means, for adapting said first device from said first mode to said second mode for receiving during said at least one information slot exchanged for transmitting by said second station in response to receiving a predetermined control signal.

3. A method of transmitting a voice signal on a single channel between at least a first station and a second station, comprising the steps of:
   providing voice and data segments on a communication channel,
   transmitting voice signals from the first station to at least the second station during at least one of said voice segments allocated to the first station for transmitting,
   transmitting data from at least the second station to the first station during at least one of said data segments allocated to at least the second station for transmitting, and
   reversing the transmission and reception of data and voice by first transmitting a command from at least the second station to the first station during at least one of said data segments allocated to at least the second station for transmitting and, then transmitting voice communication from at least the second station to the first station during at least one subsequent voice segment exchanged for at least the second station for transmiting.

4. The method of claim 3, wherein said providing step comprises providing substantially larger voice segments than data segments on said communication channel.

5. A time division multiplexed quasi-duplex system which apportions a radio frequency communications channel into voice and data time slots for two way transmission of voice signals on a single channel between at least two stations, each of said stations comprising:
   means for buffering and time compressing digitized voice signals to provide a buffered signal;
   voice transmitting means for selectively transmitting said buffered signal to at least one other station during the voice slots allocated to a first station for transmitting;
   voice receiving means for receiving voice signals transmitted to said at least one other station during the voice slots allocated to said first station for transmitting to provide a received signal;
   means for buffering and time expanding said received signal to provide a voice signal;
   data transmitting means for selectively transmitting data by said at least one other station duuring the data slots allocated to said at least one other station for transmitting;
   data receiving means for receiving data transmitted by said at least one other station during the data slots allocated to said at least one other station for transmitting;
   control means, coupled to said voice and data transmitting means and receiving means, for controlling the transmission and reception of data and voice by selectively actuating said voice and data transmitting means and receiving means; and
   means for initiating voice communication by said at least one other station during subsequent voice slots exchanged for said at least one other station for transmitting by first selectively actuating the control means to transmit data during one of the data slots allocated to said at least one other station for transmitting, thereby simulating full duplex operation on a single time division multiplexed communication channel.

6. The station of said system of claim 5 wherein said means for initiating voice communication comprises a manually operated switch.

7. The station of said system of claim 5, wherein said means for initiating voice communication comprises a voice activated switch.

8. A time division multiplexed quasi-duplex system which apportions radio frequency communication channels into voice and data time slots wherein the voice slots are substantially larger than the data slots for two way transmission of voice signals on a single channel between at least two stations comprising:
   voice transmitting means for selectively transmitting voice signals from a first station to a second station during the voice slots allocated to said first station for transmitting,
   voice receiving means for receiving voice signals transmitted by said first station during the voice slots allocated to said first station for transmitting,
   data transmitting means for selectively transmitting data from said second station to said first station during the data slots allocated to said second station for transmitting,
   data receving means for receiving data transmitted by said second station during the data slots allocated to said second station for transmitting to provide a received data signal, said data receiving means including means for synchronizing said first station to said received data signal;
   control means for controlling the transmission and reception of data and voice by selectively actuating the voice and data transmitting means and receiving means, and
   means for initiating voice communication from said second station to said first station during subsequent voice slots re-allocated to said second station for transmitting by first selectively actuating the control means transmit data during one of the data slots allocated to said second station for transmitting to indicate that said second station will initiate voice transmission.

9. An apparatus for communicating a voice signal between at least two stations via a time division multiplexed communication channel arranged into voice segments and data segments, comprising:
   at a first station:
      means for transmitting a voice signal during at least one of said voice segments allocated to said first station for transmitting;
      means for receiving a command code during at least one of said data segments allocated to a second station for transmitting; and
      means for exchanging segment allocation so as to receive voice signals during at least one of said voice segments allocated to said second station for transmitting in response to said command code; and
   at said second station:
      means for receiving said voice signal during at least one of said voice segments allocated to said first station for transmitting;
      means for transmitting said command code during at least one of said data segments allocated to said second station for transmitting; and
      means for exchanging segment allocation for transmitting thereafter, a voice signal during at least one of said voice segments allocated to said second station for transmitting in response to said command code in response to said command code.

10. A radio for use in a time division multiplexed quasi-duplex system which apportions radio frequency communication channels into voice and data time slots wherein the voice slots are substantially larger than the data slots for two way transmission of voice signals on a single channel comprising;
  voice transmitting means for selectively transmitting voice signals during the voice slots allocated for a first radio to transmit,
  voice receiving means for receiving voice signals during the voice slots allocated for said first radio to transmit,
  data transmitting means for selectively transmitting data during data slots allocted for a second radio to transmit,
  data receiving means for receiving data during the data slots allocated for said second radio to transmit,
  control means for controlling the transmission and reception of data and voice by selectively actuating the voice and data transmitting means and receiving means, and
  means for initiating voice transmission by selectively actuating the control means to transmit data during one of the slots so indicate that the radio will initiate voice transmission during at least one subsequent voice slots exchanged for said second radio to transmit.

11. A method for communicating, in parallel, at least a first and second information signal between at least two pair of stations via a time division multiple access communication channel arranged to provide at least a first and a second frame each having a plurality of voice and data time slots wherein the voice slots are substantially larger than the data slots, comprising the steps of:
  at a first station:
    (a) transmitting a first information signal during a voice slot within said first frame, said voice slot allocated to said first station to transmit;
    (b) receiving a command code during a data slot within said first frame, said data slot of said first frame allocated to said second station to transmit;
    (c) transmitting at least one of a plurality of acknowledge codes during at least a data slot within said second frame; and
    (d) exchanging slot allocations to receive information signals during at least one voice slot of at least one subsequent frame, said at least one voice of said subsequent frame allocated to said second station to transmit in response to said command code;
  at said second station:
    (a) receiving said first information signal during said voice slots within said first frame;
    (b) transmitting said command code during said data slot within said first frame;
    (c) receiving at least one of said acknowledge codes during at least said data slot within said second frame; and
    (d) exchanging slot allocations for transmitting thereafter, an information signal during at least one voice slot of at least one subsequent frame, said at least one voice slot allocated to said second station to transmit in response to said command code;
  at a third station;
    (a) transmitting a second information signal during another one of said plurality of voice slots within said first frame, said another voice slot allocated to said third station to transmit;
    (b) receiving a command code during another one of said plurality of data slots within said first frame, said another data slot allocated to a fourth station to transmit;
    (c) transmitting at least one of a plurality of acknowledge codes during at least another one of said plurality of data slots within said second frame; and
    (d) exchanging slot allocations to receive information signals during at least one voice slot of at least one subsequent frame, said at least one voice slot allocated to said fourth station to transmit in response to said command code; and
  at said fourth station:
    (a) receiving said second information signal during said another one of saidd plurality of voice slots within said first frame;
    (b) transmitting said command code during said another one of said plurality of data slots within said first frame;
    (c) receiving said acknowledge code during at least said another one of said plurality of data slots within said second frame; and
    (d) exchanging slot allocations for transmitting thereafter, an information signal during at least one voice slot of at least one subsequent frame, said at least one voice slot allocated to said fourth station to transmit in response to said command code.

12. In a quasi-duplex TDM communication system having at least one communication channel allocated among a plurality of subscriber units and each subscriber having at least an identification code, a method for any of the plurality of subscriber to request access to a communication channel arranged into frames comprising the steps of:
  at a first subscriber unit:
    (a) transmitting, an information signal comprising at least an address representing a second subscriber's identification code in a slot having a majority of a frame allocated for said first subscriber unit;
    (b) receiving at least a control signal for each information signal transmitted in a slot having a minority of said frame allocated for a second subscriber unit;
    (c) transmitting a voice signal in said slot having said majority of said frame;
    (d) receiving at least a command code for the first subscriber unit to listen in said slot having said minority of said frame;
    (e) transmitting at least a control signal to acknowledge receipt of said command code in said slot having said minority of said frame; and
    (f) receiving voice signals in said slot having said majority of said frame re-allocated for said second subscriber unit in response to said command code until transmission of another command code; and
  at said second subscriber unit:
    (a) receving at least said address in said slot having said majority of said frame allocated for said first subscriber unit and synchronizing in said slot having said minority of said frame in response thereto;

(b) transmitting at least said control signal in said slot having said minority of said frame in response to step (a);

(c) receiving at least said voice signal in said slot having said majority of said frame;

(d) transmitting at least said command code for the second subscriber unit to talk in said slot having said minority of said frame;

(e) receiving at least said control signal to initiate voice communication in said slot having said minority of said frame; and (f) transmitting thereafter, a voice signal in said slot having said majority of said frame re-allocated to said second subscriber unit in response to said command code for the second subscriber unit to talk until a further command signal has been received.

* * * * *

UNITED STATES PATENT AND TRADEMARK OFFICE
CERTIFICATE OF CORRECTION

PATENT NO. : 4,949,335

DATED : August 14, 1990

INVENTOR(S) : MOORE, Morris A.

It is certified that error appears in the above-identified patent and that said Letters Patent is hereby corrected as shown below:

In column 4, line 14, delete "mmulti" and insert --multi--;

Column 5, line 29, delete "communications" and insert --communication--;

Column 5, line 48, delete "duuring" and insert --during--;

Column 6, line 38 after "means" insert "to";

Column 7, line 16 after "during" insert "the";

Column 7, line 16 delete "allocted" and insert --allocated--;

Column 7, line 27, delete "so" and insert --to--;

Column 7, line 29, delete "slots" and insert --slot--;

Column 7, line 57, delete "slots" and insert --slot--; and

Column 8, line 21, delete "saidd" and insert --said--.

Signed and Sealed this

Seventeenth Day of March, 1992

Attest:

HARRY F. MANBECK, JR.

*Attesting Officer*     Commissioner of Patents and Trademarks